No. 868,016.  
PATENTED OCT. 15, 1907.  
J. P. ROE.  
MEANS OR APPARATUS FOR THE FORMATION OF SPOIL HEAPS, BANKS, &c.  
APPLICATION FILED MAR. 12, 1906.  
7 SHEETS—SHEET 1.
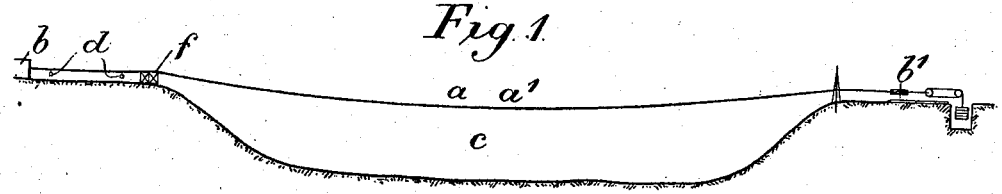
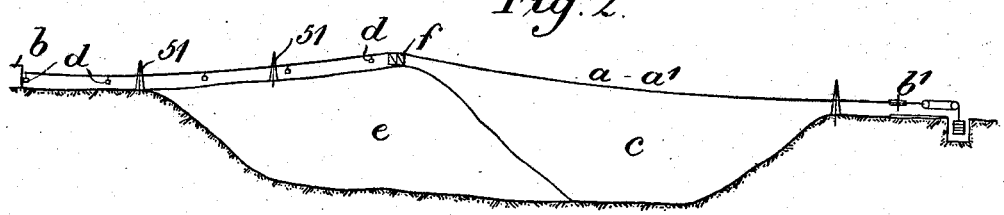
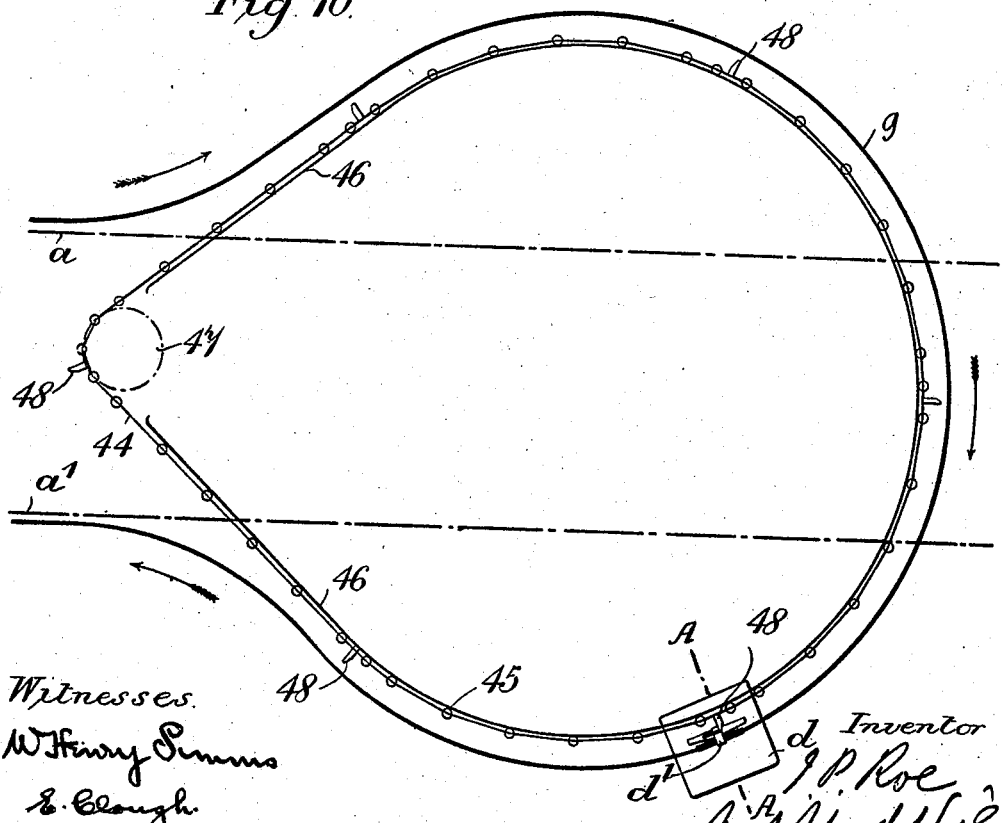
Witnesses  
W. Henry Simms  
E. Clough
Inventor  
J. P. Roe
Attorney No. 868,016. PATENTED OCT. 15, 1907.
J. P. ROE.
MEANS OR APPARATUS FOR THE FORMATION OF SPOIL HEAPS, BANKS, &c.
APPLICATION FILED MAR. 12, 1906.
7 SHEETS—SHEET 2.
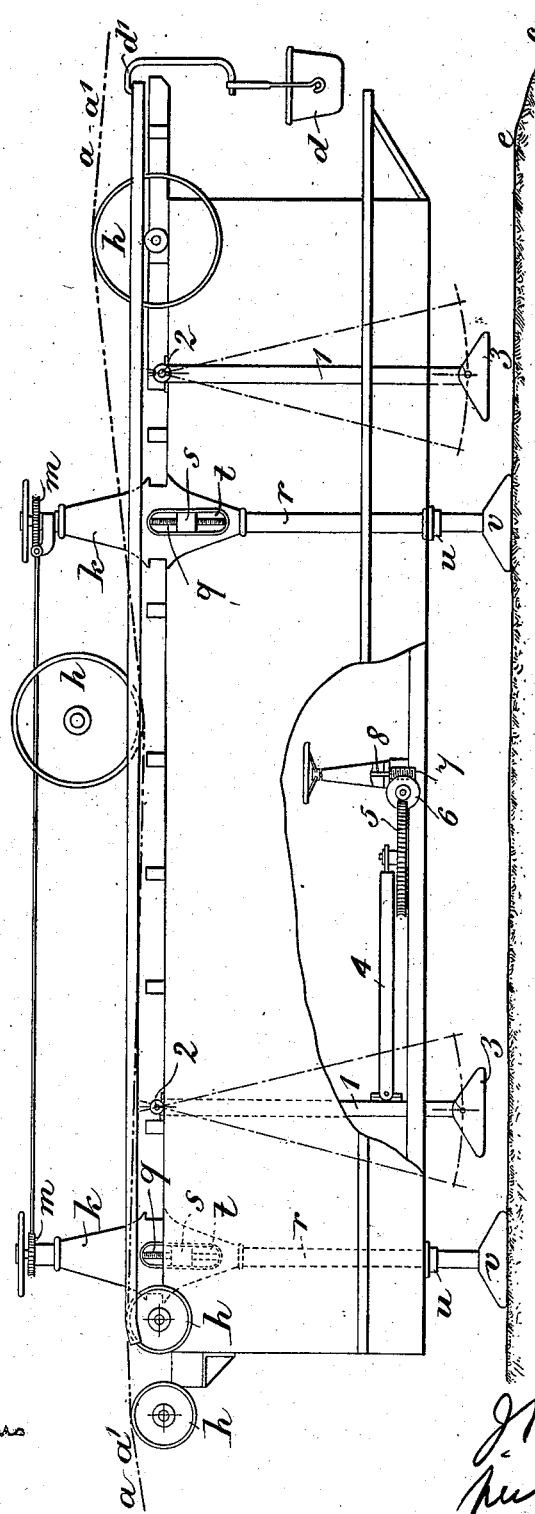

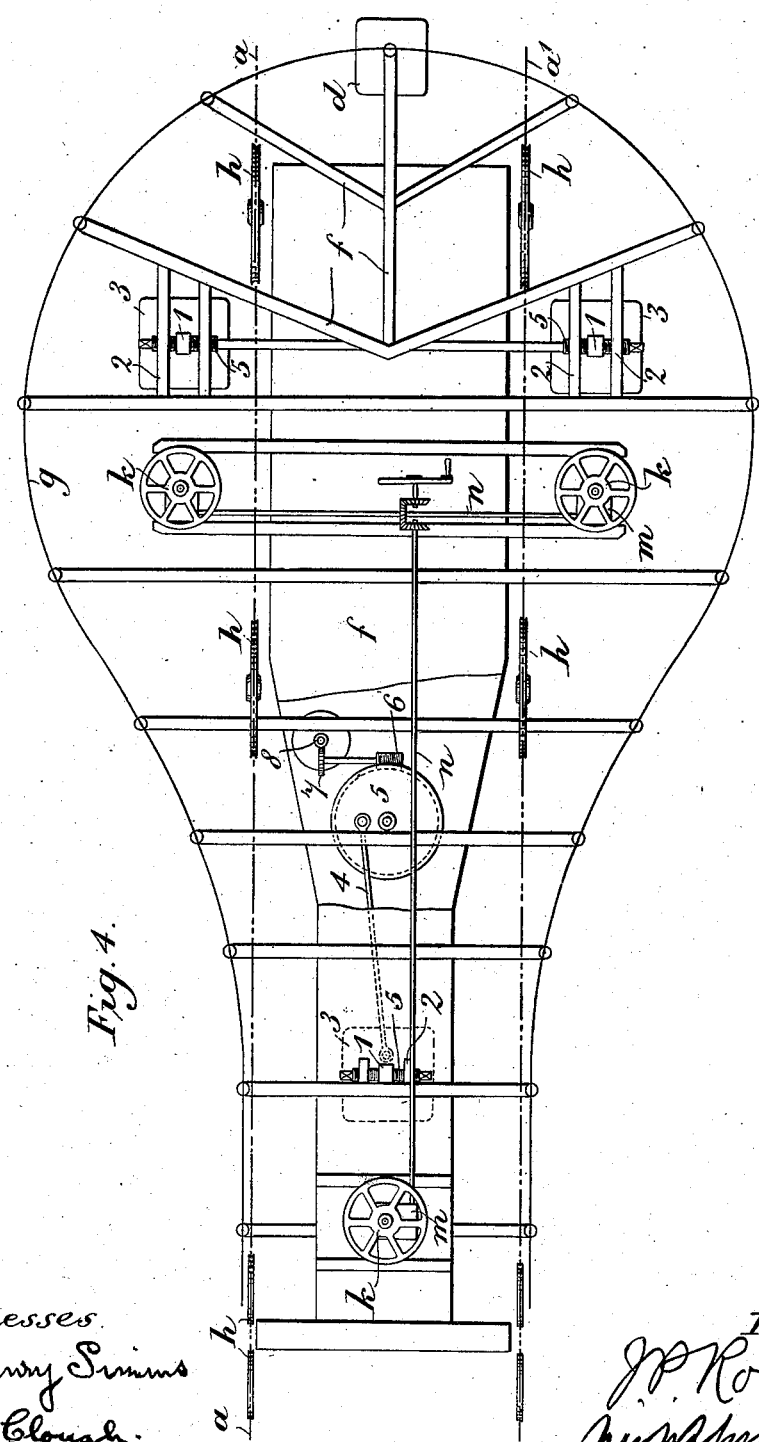

No. 868,016. PATENTED OCT. 15, 1907.
J. P. ROE.
MEANS OR APPARATUS FOR THE FORMATION OF SPOIL HEAPS, BANKS, &c.
APPLICATION FILED MAR. 12, 1906.

7 SHEETS—SHEET 4.

No. 868,016. PATENTED OCT. 15, 1907.
J. P. ROE.
MEANS OR APPARATUS FOR THE FORMATION OF SPOIL HEAPS, BANKS, &c.
APPLICATION FILED MAR. 12, 1906.
7 SHEETS—SHEET 5.
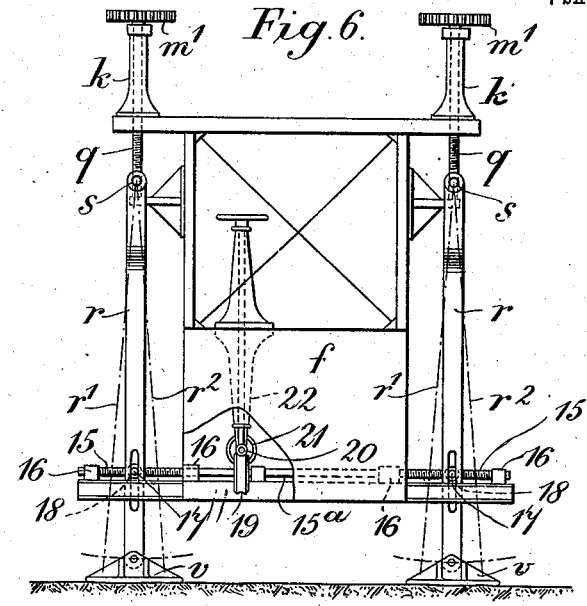

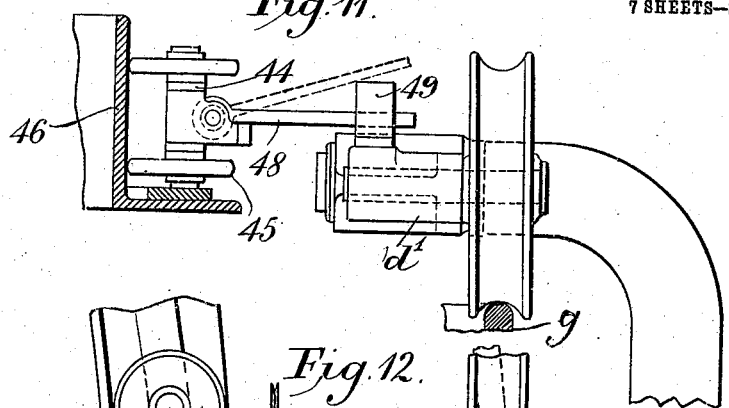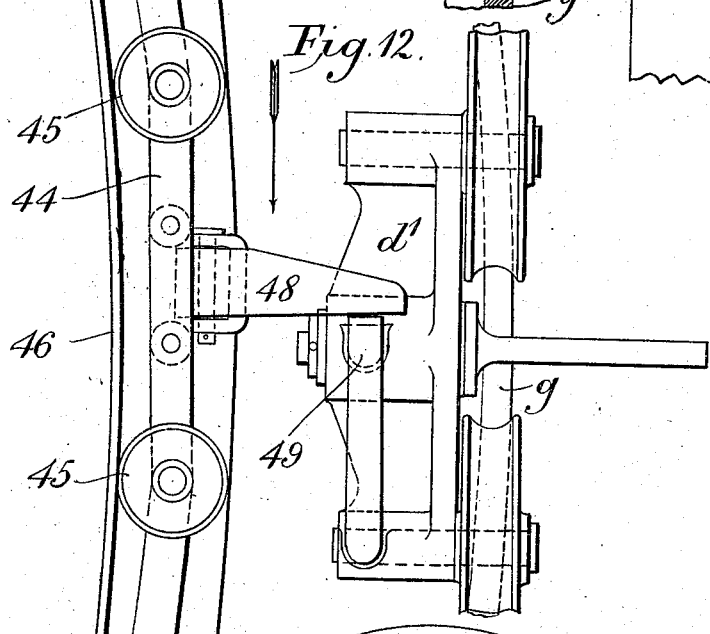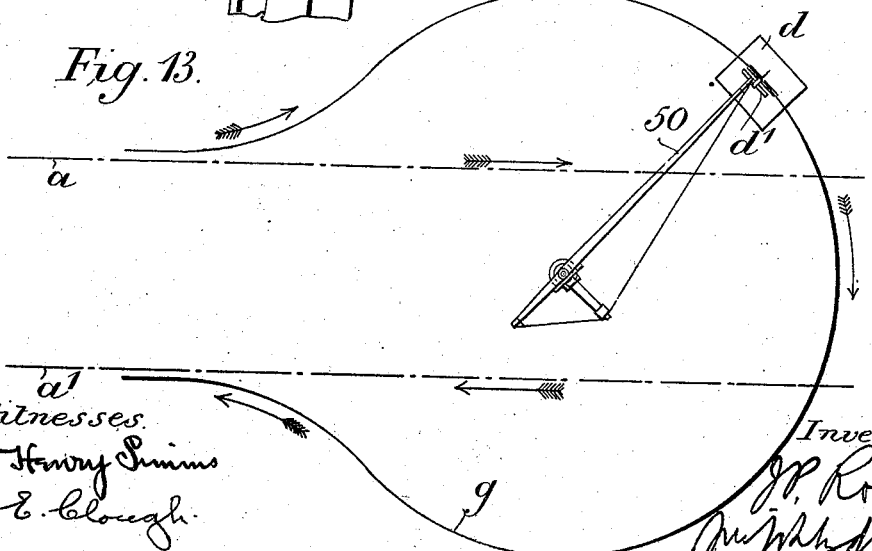

No. 868,016. PATENTED OCT. 15, 1907.
J. P. ROE.
MEANS OR APPARATUS FOR THE FORMATION OF SPOIL HEAPS, BANKS, &c.
APPLICATION FILED MAR. 12, 1906.
7 SHEETS—SHEET 7.
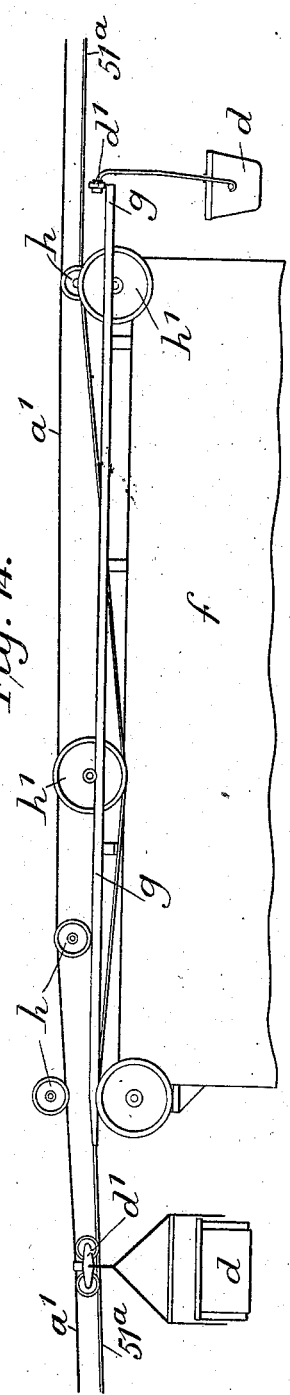
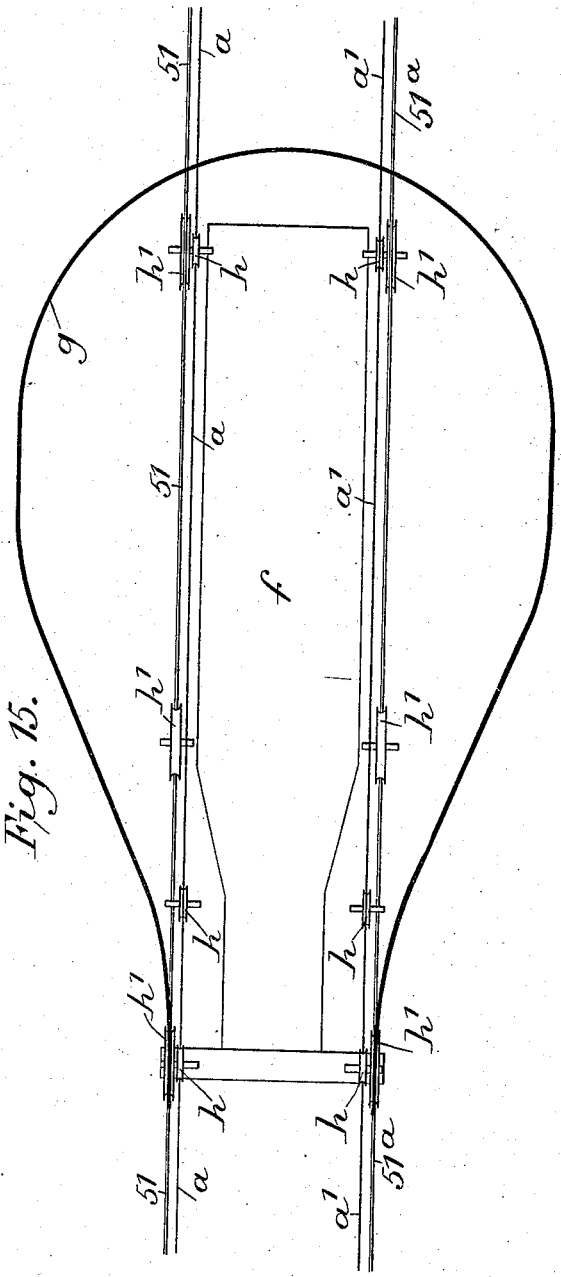

UNITED STATES PATENT OFFICE.

JOHN PEARCE ROE, OF LONDON, ENGLAND, ASSIGNOR TO ROPEWAY'S LIMITED, OF FINSBURY, ENGLAND.

MEANS OR APPARATUS FOR THE FORMATION OF SPOIL HEAPS, BANKS, &c.

No. 868,016.　　　　　Specification of Letters Patent.　　　　Patented Oct. 15, 1907.

Application filed March 12, 1906. Serial No. 305,662.

*To all whom it may concern:*

Be it known that I, JOHN PEARCE ROE, a subject of the King of Great Britain and Ireland, residing at London, England, have invented Improvements in and Means for Apparatus for the Formation of Spoil Heaps, Banks, and the Like, of which the following is a specification.

This invention has for its object *inter alia*, the formation of spoil heaps, banks and the like, such as embankments, (hereinafter called dumps or spoil banks) by means of aerial ropeways in such a manner as to avoid the necessity of tipping the buckets or vehicles from elevated ropes passing over high structures or trestles for supporting the ropes at such altitudes as to permit dumps or spoil banks of the required height being formed beneath.

In the ordinary way of forming dumps or spoil banks as above described, it is furthermore generally necessary to have the outer terminal for the rope on an elevated structure to which place the buckets continue their journey and then run on to a usually more or less semi-circular rail track connecting the incoming rope or ropes with the out-going or return rope or ropes.

Now the present invention, which is applicable to that form of ropeway in which a single endless rope performs the dual function of supporting and conveying the loads along, and also to that form of ropeway having stationary cables whereon the bucket carriers run and are hauled or controlled by a separate endless traction rope, is designed to do away with the high and expensive structures referred to, and at the same time to permit of dumps and spoil banks being formed of any desired altitude and extension and of the buckets being returned direct to the outgoing rope from the dumping place, instead of, as is usual, from the back end or outward terminal. For this purpose a frame is employed that is suitably braced to resist the various strains to which it may be subjected, and is constructed with a shunt rail for receiving the bucket carriers from an incoming rope and passing them on to an outgoing rope. The frame is likewise provided with sheaves for supporting or depressing or otherwise guiding the ropes, and with appliances whereby it can be moved vertically and horizontally at will, using the ground as a base. These appliances can be variously constructed and arranged. The appliances for lifting the frame may conveniently consist of three or more jacks having vertical movement and provided with feet or shoes of sufficient area to sustain the weight of the frame and its accessories upon or from the top of a dump or bank. These feet or shoes are hereinafter called for distinction and brevity, lifting shoes. For enabling the frame to be moved horizontally or endwise it is provided, according to one construction, with bearing surfaces or shoes that are of sufficient area to sustain the necessary pressure when the weight of the frame is taken by them and not by the jacks, and are so mounted in or on the frame that a sliding, rolling or oscillating movement in a more or less horizontal direction, in relation to the frame, can be imparted to them by suitable mechanism. Such surfaces or shoes are hereinafter called for distinction and brevity advancing shoes.

The method of forming a dump or spoil bank according to this invention is as follows:—Assuming the frame to be supported by its advancing shoes and the lifting shoes to be raised free from or above the ground or dump top, the buckets coming on to the shunt rail from the incoming rope would have their contents tipped round and under the frame until the material so dumped was made up to the under side of the lifting shoes, the empty buckets passing on from the shunt rail to the outgoing rope. The lifting shoes are then depressed until they take the weight of the frame, and then by continuing the jack action, the frame is raised until the advancing shoes are in their turn lifted clear of the top of the dump. Tipping is then proceeded with until the material is made up to the underside of the said advancing shoes which are then again caused to sustain the weight of the frame by slacking back or running up the lifting jacks and shoes. For again lifting the frame, the foregoing cycle or sequence of movements is repeated until the desired height of dump is attained.

Horizontal or progressive movement of the frame for extending the dump is effected when the weight of the frame is carried by the advancing shoes, so that, assuming the said shoes to be stationary upon the dump, the frame is moved with relation to the shoes, and the dump upon which they rest, by suitable mechanism, such as screws or other known means for effecting the necessary horizontal movement.

In practice, when forming a dump, the vertical and horizontal movements may be effected alternately, simultaneously, or in such sequence that the raising and progression of the dump would be in accordance with the requirements, that is to say, the top of the dump may be projected horizontally, or at an upward or downward inclination. From the foregoing description it will be seen that the dump itself forms a base for the dumping frame without the aid of extraneous supports.

It is furthermore to be observed that the dumping frame does not form a terminal so far as the rope or ropes is or are concerned, as the rope or ropes would pass through the frame to an outward terminal placed in advance of the dumping place, the said terminal taking the whole of the tensional strain of the rope or ropes so that the dumping frame would be free from such strain and its horizontal and vertical movements thereby rendered easy.

It will also be seen that the rope or ropes between the dumping frame and the outward terminal are idle ropes in the sense that they will not carry buckets, as these will pass from the rope or ropes on the incoming side of the frame to the rope or ropes on the outgoing side thereof by way of the shunt rail on the said frame.

In the foregoing description, mechanism in the form of jacks having a vertical movement, and separate mechanism having a horizontal, sliding or oscillating movement, have been described, but alternatively to the above, jacks having both vertical and horizontal or oscillating movements may be employed, so that the frame can be moved horizontally as well as vertically when its weight is taken by the lifting shoes of the jacks. When the weight is released from the jacks it would be then taken upon bearing surfaces or shoes that are fixed to the frame and which in this case will have no horizontal movement in relation thereto, unless it be a small crosswise one for transverse adjustment of the frame. This transverse movement, which is for the purpose of maintaining the frame in alinement with the ropes, may be given to any of the shoes.

Where jacks are used for the vertical movement only, the horizontal movement may be effected by oscillating legs pivotally mounted on the frame and provided with advancing shoes at their lower extremities for taking the weight of the frame when the jacks are idle. In this case after the weight of the frame has again been taken by the jacks, the legs are turned in a forward direction to bring the advancing shoes on their lower ends into a new forward position preparatory to again moving the frame in a forward direction. Or the vertical movement may be produced by the jacks operating through oscillating or pivotally mounted legs, the horizontal or forward movement of the frame being effected by causing the frame to move relatively to the lower ends of the legs by suitable mechanism, the legs then turning about their lower ends as centers. In this case, when the weight of the frame is again taken by the bearing surfaces or shoes on the frame bearing upon the dump or spoil bank, the jacks and legs are raised, the legs turned in a forward direction to bring the advancing shoes thereon into a new forward position, and the jacks and legs lowered to again raise the frame and allow of its being moved forward to a further extent.

For the purpose of forming a wide dump, instead of the contents of the buckets being shot direct on to the dump, a conveyer or conveyers may be employed which would receive the material from the buckets and distribute it in any desired direction.

The conveyer or conveyers may be pivotally mounted at the end which would receive the material, so that the other end could distribute the material in an arc; or the conveyer or conveyers may be otherwise mounted in the frame so as to distribute the material in such a way as to vary the width of dump as required.

Motive power for the conveyer or conveyers may be taken from any suitable moving part in the dumping frame, or other power may be employed.

The various movements described may be effected by hand, by motor, or by mechanism driven from the moving ropes or by other mechanical means.

For causing the bucket carriers to be positively moved at any desired speed along the shunt rail from the incoming rope or ropes to the outgoing or return rope or ropes, the dumping frame may be provided with mechanically operated means adapted to engage with the bucket carriers and move them along the shunt rail.

In the accompanying illustrative drawings, Figures 1 and 2 are diagrams showing apparatus for the formation of dumps or spoil banks according to this invention. Figs. 3 and 4 show respectively in side elevation, with part broken away, and in plan, and more or less diagrammatically, one construction of dumping frame according to this invention. Figs. 5 and 6 show respectively in side and end elevation, a dumping frame with modified appliances for raising the same and moving it forward and sidewise. Figs. 7 and 8 are part views, at right angles to one another, showing a modified arrangement of part of the mechanism. Fig. 9 is a diagrammatic view showing a modified construction of frame. Fig. 10 is a plan showing part of the dumping frame with means for positively moving the bucket carriers around the shunt rail. Fig. 11 is a vertical section corresponding to the line A—A of Fig. 10, and Fig. 12 is a corresponding plan, showing parts of the apparatus to a larger scale. Fig. 13 shows in plan a modified arrangement for positively moving the bucket carriers around the shunt rail. Figs. 14 and 15 show respectively in side elevation and plan, the dumping frame adapted to carry traveling and stationary ropes.

$a$, $a^1$ are the two parallel portions of an endless traveling rope which passes around sheaves at the charging station $b$ and the outward terminal $b^1$ and over the dumping place $c$, for example a valley, where refuse or other material is to be dumped from buckets $d$ to form a dump or spoil bank $e$.

$f$ is a frame of the kind hereinbefore described built up in any suitable manner to possess the required strength and rigidity. It is provided with a shunt rail $g$ extending along its sides and around its front end for receiving the bucket carriers $d^1$ from the incoming portion $a$ of the endless rope and allowing them to pass, after the buckets $d$ have been tipped, on to the outgoing portion $a^1$ of the rope, and also with sheaves $h$ for supporting and guiding the two portions of the rope.

The means provided for lifting the frame $f$ comprise in this example, three screw jacks $k$ adapted to be operated through worm gearing $m$ and shafts $n$ which may be worked by hand or otherwise, as may be desired. The vertically movable screw $q$ of each screw jack is suitably connected to a vertical leg or support $r$ the upper end of which is connected to a cross piece $s$, the ends of which work in oppositely arranged slots $t$ in the jack frame, and the lower end of which extends through a guide $u$ on the frame and is provided with a lifting shoe $v$ adapted to bear upon the ground or the top of the dump or bank $e$.

The means provided for moving the frame $f$ horizontally, comprise in this example, three oscillating legs 1 each of which is pivoted at its upper end to the frame at 2 and has jointed to its lower end an advancing shoe 3. Each leg is arranged to be oscillated about a center in bearings 2 through an angle represented by dotted lines in Fig. 3, by a connecting rod 4 from a crank disk 5 which is arranged to be rotated through worm gearing at 6 and 7 from a shaft 8 adapted to be rotated by hand or otherwise as may be desired.

In the figures, the mechanism for oscillating only one of the legs 1 is shown, to avoid complication, but each of the other legs 1 is similarly provided with operating mechanism, located at convenient positions within the frame $f$.

To allow of lateral adjustment of the frame $f$, for maintaining the latter in alinement with the rope $a$, $a^1$, the upper end of each oscillating leg 1 may be journaled on a screw 5 that is endwise adjustable in the bearings 2, so that by turning the several screws 5 when the frame is supported by the legs 1, the frame can be moved laterally to a small extent.

With the construction described, by operating the screw jacks $k$ in one direction, the lifting feet $v$ can be caused to bear upon the dump $e$ and raise the frame $f$ with oscillating legs 1 and shoes 3 to a suitable extent, and by operating the screw jacks in the opposite direction, the advancing shoes 3 can be caused to bear upon the dump and leave the frame $f$ supported upon the legs 1 which can then be caused to turn in a forward direction about their pivotal connections 2 with the advancing shoes 3 to cause forward movement of the frame. Thus, the frame can be raised step by step to gradually increase the height of the dump, or moved forward step by step to advance the dump, or the dump can be raised and advanced alternately, in the manner hereinbefore described to suit requirement.

In the modified arrangement shown in Figs. 5 and 6 the frame $f$ has two pairs of legs $r$ provided with lifting shoes $v$, each leg being arranged to be operated by a separate screw jack $k$ adapted to be operated through spur gearing $m^1$ from a shaft $n^1$ parallel to the lifting screw $q$. The advancing shoes 3, of which there are two pairs, are each connected to a support 7 provided with a nut 8 through which works a longitudinally arranged screw 9 that is mounted to turn but not to move endwise in bearings 10 on the frame $f$ and is adapted to be rotated through bevel gearing 11 from a shaft 12 adapted to be operated by hand or otherwise. The arrangement is such that when the legs $r$ with lifting shoes $v$ are raised so that the advancing shoes 3 bear upon the dump and take the weight of the frame, the latter can be advanced by rotating the several screws 9 simultaneously in the proper direction. In this example, lateral adjustment of the frame is provided for by jointing the upper ends of the legs $r$ to the cross pieces $s$ with which the lifting screws $q$ engage, and pivoting their lower ends to the lifting shoes $v$ so as to allow of the frame being swung sidewise about the pivotal connections between the legs and shoes. This lateral swinging movement is effected by horizontal screws 15 each of which is mounted to turn, but not to move endwise, in bearings 16 on the frame $f$, and works through a swivel nut 17 which is connected by a pin and slot connection 18 to a forked or divided portion of the corresponding leg $r$. The screws 15 for each pair of legs are connected together by a spindle $15^a$ and are arranged to be rotated, when required, through worm gearing 19, a shaft 20, and bevel gearing 21 from a shaft 22 adapted to be operated by hand or otherwise. By rotating the screws 15 after the legs $r$ have been moved into the dotted position $r^1$ or $r^2$ and when the frame $f$ is supported by the lifting shoes $v$, the frame with legs $r$ can be moved sidewise in one or other direction.

In the modified arrangement of screw mechanism for effecting the lateral adjustment of the frame $f$ shown in Figs. 7 and 8, each leg $r$ is pivoted at the upper end as in Figs. 5 and 6 but extends near its lower end through a guide ring 23 that has a convex inner surface as shown at $23^a$ and is provided at its opposite sides with lateral extensions 24 through which work a pair of screws 25 that are mounted to rotate in stationary bearings 26 and each of which is arranged to be rotated through worm gearing 27 from a shaft 28 that is connected through bevel gearing 29 to a shaft 30 adapted to be worked by hand or otherwise, as may be desired. The arrangement is such that by rotating the screws 25, the guide rings 23 can be moved laterally in either direction for effecting the desired lateral adjustment of the frame $f$.

Fig. 9 shows, diagrammatically, a construction of frame wherein the legs $r$ are adapted to effect both the vertical and horizontal movements thereof. In this case, the said legs are jointed at their upper ends to the cross pieces $s$ (Fig. 3) to which the jack screws $q$ are connected, so that they can swing in longitudinal vertical planes, as indicated by the dotted lines $r^3$ $r^4$, and each of them is connected by a link 31 to means, such as a longitudinal rack 32 operated by a pinion 33 and worm gearing 34 from a rod 35, for oscillating it about its upper end when it is raised off the ground, or about its shoe $v$ when this is bearing upon the ground. $3^a$ are bearing shoes which in this case are fixed to the underside of the frame. The actions of lifting and advancing the frame are substantially the same as hereinbefore described, that is to say, the weight of the frame is alternately taken by the shoes $v$ and $3^a$.

Fig. 5 shows how the dumping frame $f$ may be provided with a conveyer for distributing over the dump $e$, material received from the buckets $d$. In this example, the conveyer comprises an endless belt 36 working around pulleys 37 carried by a frame 38 that is mounted to turn about a vertical pivot pin 39 at its inner end and is supported at its outer end by a tie rod 40 the upper end of which is jointed to a pin 41 co-axial with the pivot pin 39 so that the conveyer can be moved around the front end of the frame $f$. The inner end of the conveyer frame 38 is provided with a hopper 42 arranged to receive material from a bucket $d$ above it, and deliver it to the conveyer band 36. The inner pulley 37 is driven by suitable means, as for example by an electric motor 43. Two or more conveyers may be mounted as described on the frame.

Figs. 10, 11 and 12 show the dumping frame with means for positively moving the bucket carriers $d^1$ around the shunt rail $g$. In this arrangement an endless chain 44 provided with rollers 45 is arranged to work around a fixed support 46 arranged concentrically inside the shunt rail $g$, and also around a driving wheel 47, the chain being provided at intervals with horizontally pivoted and outwardly projecting fingers 48 adapted to act against shoulders or projections 49 on the bucket carriers $d^1$ and positively move the same and the buckets suspended therefrom around the shunt rail $g$.

In the modified arrangement shown in Fig. 13, a rotary radial arm 50 pivoted on the frame and driven from a rotary part thereon, is arranged to act upon the bucket carriers $d^1$ and move the same around the shunt rail $g$. If desired, two or more such arms, fixed to a common hub or center, may be used for the purpose mentioned.

Similar apparatus to that hereinbefore described is used when stationary ropes are provided for supporting the bucket carriers, and a separate endless traction rope is used for hauling or controlling the buckets.

Figs. 14 and 15 show respectively in side elevation and plan, an arrangement of this kind, wherein 51, 51$^a$ are the stationary ropes for supporting the bucket carriers $d^1$, and $a$, $a^1$ the separate traction or hauling ropes. $h^1$ are sheaves for supporting and guiding the stationary ropes 51, 51$^a$ on the frame $f$ and leading them over and past the shunt rail $g$, and $h$ are the sheaves for supporting and guiding the traction or hauling ropes $a$, $a^1$ on the frame and leading them over the shunt rail.

In each case, as the dump or spoil bank $e$ becomes extended in length in the manner hereinbefore described, short trestles 51 (Fig. 2) are mounted at suitable intervals upon the dump, at the rear of the dumping frame $f$, to support the portions of the rope or ropes between the frame $f$ and the loading station $b$.

As will be obvious the details of construction of the apparatus employed can be variously modified without departing from the spirit and scope of the invention so long as the relative arrangement of the main parts of such apparatus, or the mode of operation is preserved.

Also, a vertically and horizontally movable frame constructed and adapted for use in the manner described can be employed for various purposes in the disposal of material of various kinds. Thus, in some cases, instead of being used as a dumping frame, it may be used as a loading frame, that is to say at a place where the buckets are run from an incoming rope or ropes onto a shunt rail, then charged with material, and then run onto an outgoing rope or ropes.

What I claim is:—

1. A movable frame suitable for use in the formation of spoil heaps, banks and the like, said frame being designed to rest upon the ground, ropes supported by and passing through said frame, a shunt rail carried by said frame and adapted to receive carriers on detachment from one of said ropes and to support and guide them to a position for attachment to another of said ropes, and appliances for moving said frame with reference to the ground as a base.

2. A movable frame suitable for use in the formation of spoil heaps, banks and the like, said frame being designed to rest upon the ground, ropes supported by and passing through said frame, a shunt rail carried by said frame and adapted to receive carriers from an incoming rope and pass them to an outgoing rope, means carried by said frame for supporting and guiding said ropes, and appliances for moving the said frame with reference to the ground as a base.

3. A movable frame suitable for use in the formation of spoil heaps, banks and the like, said frame being designed to rest upon the ground and having rope guiding and supporting means thereon, a shunt rail for receiving bucket carriers on detachment from an incoming rope and supporting and guiding them to a position for attachment to an outgoing rope, and appliances for lifting the said frame bodily with reference to the ground as a base.

4. A movable frame suitable for use in the formation of spoil heaps, banks and the like, said frame being designed to rest upon the ground and having thereon rope supporting and guiding means, a shunt rail for receiving carriers from an incoming rope and passing them to an outgoing rope, and adjustable appliances adapted to be brought into contact with the ground and to take the whole weight of the frame and whereby the said frame can be moved horizontally with reference to the ground as a base.

5. A movable frame suitable for use in the formation of spoil heaps, banks and the like, said frame being designed to rest upon the ground and having thereon rope supporting and guiding means, a shunt rail for receiving carriers from an incoming portion of rope and passing them to an outgoing portion of rope, and appliances arranged to take the whole weight of the frame and attachments and adapted to move the said frame bodily both vertically and horizontally with reference to the ground as a base.

6. A frame suitable for use in the formation of spoil heaps, banks and the like, and designed to rest upon the ground, ropes passing through said frame and extending onward therefrom, a shunt rail carried by said frame and adapted to receive carriers from one of said ropes and pass them to another of said ropes, and appliances carried by said frame for moving it vertically and horizontally with reference to the ground as a base.

7. A frame suitable for use in the formation of spoil heaps, banks and the like, and designed to rest upon the ground, incoming and outgoing traveling ropes passing through said frame and extending onward therefrom, a shunt rail carried by said frame and adapted to receive carriers from an incoming traveling rope and pass them to an outgoing traveling rope, and appliances carried by said frame for moving it vertically and horizontally with reference to the ground as a base.

8. A frame suitable for use in the formation of spoil heaps, banks and the like, and designed to rest upon the ground, incoming and outgoing traveling ropes passing through said frame and extending onward therefrom, means for supporting, depressing and guiding said traveling ropes, a shunt rail carried by said frame and adapted to receive carriers from an incoming traveling rope and pass them to an outgoing traveling rope, and appliances carried by said frame for moving it vertically and horizontally with reference to the ground as a base.

9. A movable frame suitable for use in the formation of spoil heaps, banks and the like, said frame being designed to rest upon the ground and having thereon rope supporting and guiding means, a shunt rail for receiving carriers from an incoming portion of rope and passing them to an outgoing portion of rope, and jacks adapted to act against the ground as a base and take the whole weight of and lift said frame bodily.

10. A movable frame suitable for use in the formation of spoil heaps, banks and the like, said frame being designed to rest upon the ground and having a shunt rail for receiving carriers from an incoming traveling rope and passing them to an outgoing traveling rope, lifting jacks provided with shoes and adapted to lift said frame, and advancing shoes for enabling said frame to be moved forward, said advancing shoes being adapted to take the weight of the frame.

11. A movable frame suitable for use in the formation of spoil heaps, banks and the like, said frame being designed to rest upon the ground and having a shunt rail for receiving carriers from an incoming traveling rope and passing them to an outgoing traveling rope, lifting jacks provided with shoes for lifting the said frame and advancing shoes adapted to be moved in a backward and forward direction relatively to said frame.

12. A movable frame suitable for use in the formation of spoil heaps, banks and the like, said frame being designed to rest upon the ground and having a shunt rail for receiving carriers from an incoming traveling rope and passing them to an outgoing traveling rope, lifting jacks adapted to lift said frame from the ground, advancing shoes, oscillating legs carrying said advancing shoes, and means for oscillating said legs in longitudinal vertical planes.

13. A movable frame suitable for use in the formation of spoil heaps, banks and the like, said frame being designed to rest upon the ground and having a shunt rail for receiving carriers from an incoming traveling rope and passing them to an outgoing traveling rope, lifting jacks provided with shoes for lifting said frame from said ground, advancing shoes, oscillating legs carrying said advancing shoes and means for oscillating said legs in longitudinal vertical planes.

14. A movable frame suitable for use in the formation of spoil heaps, banks and the like, said frame being designed to rest upon the ground and having a shunt rail for receiving carriers from an incoming traveling rope and passing them to an outgoing traveling rope, appliances for moving said frame with reference to the ground as a base, and means for laterally adjusting said frame on the ground.

15. A movable frame suitable for use in the formation of spoil heaps, banks and the like, said frame being designed to rest upon the ground and having a shunt rail for receiving carriers from an incoming traveling rope and passing them to an outgoing traveling rope, appliances for moving the said frame both vertically and horizontally with reference to the ground as a base, and means for adjusting said frame laterally on the ground.

16. A movable frame suitable for use in the formation of spoil heaps, banks and the like, said frame being designed to rest upon the ground and having a shunt rail for receiving carriers from an incoming traveling rope and passing them to an outgoing traveling rope, lifting jacks each carrying a leg or support provided at its lower end with a lifting shoe adapted to bear upon the ground, oscillating legs jointed to said frame and provided at their lower ends with advancing shoes adapted to bear upon the ground, each of said oscillating legs being adjustable in a lateral direction relatively to said frame, means for moving said lifting jacks vertically, and means for moving each of said oscillating legs in a longitudinal direction relatively to said frame.

17. A movable frame suitable for use in the formation of spoil heaps, banks and the like, said frame being designed to rest upon the ground and having a shunt rail for receiving carriers from an incoming traveling rope and passing them to an outgoing traveling rope, appliances for moving said frame with reference to the ground as a base, and a conveyer for distributing material received from the buckets.

18. A frame suitable for use in the formation of spoil heaps, banks and the like, and designed to rest upon the ground, ropes passing through said frame and extending onward therefrom, a shunt rail carried by said frame and adapted to receive carriers from one of said ropes and pass them to another of said ropes, appliances carried by said frame for moving it vertically and horizontally with reference to the ground as a base, and a conveyer for distributing material received from the buckets.

19. A movable frame suitable for use in the formation of spoil heaps, banks and the like, said frame being designed to rest upon the ground and having thereon rope supporting and guiding means, a shunt rail for receiving carriers from an incoming portion of rope and passing them to an outgoing portion of rope, means adapted to act upon and positively move said bucket carriers along said shunt rail, and appliances for moving said frame bodily with reference to the ground as a base.

20. A frame suitable for use in the formation of spoil heaps, banks and the like, and designed to rest upon the ground, ropes passing through said frame and extending onward therefrom, a shunt rail carried by said frame and adapted to receive carriers from one of said ropes and pass them to another of said ropes, means for positively moving said carriers along said shunt rail, and appliances carried by said frame for moving it vertically and horizontally with reference to the ground as a base.

21. A frame suitable for use in the formation of spoil heaps, banks and the like, and designed to rest upon the ground, ropes passing through said frame and extending onward therefrom, a shunt rail carried by said frame and adapted to receive carriers from one of said ropes and pass them to another of said ropes, means for positively moving said carriers along said shunt rail, appliances carried by said frame for moving it vertically and horizontally with reference to the ground as a base, and a conveyer for distributing material received from the buckets.

22. A movable frame suitable for use in the formation of spoil heaps, banks and the like, said frame being designed to rest upon the ground and having a shunt rail for receiving carriers from an incoming traveling rope and passing them to an outgoing traveling rope, a device adapted to move in proximity to said shunt rail and engage carriers thereon and move the same along said shunt rail from one rope to the other, and appliances for moving said frame with reference to the ground as a base.

23. A movable frame suitable for use in the formation of spoil heaps, banks and the like, said frame being designed to rest upon the ground and having a shunt rail for receiving carriers from an incoming traveling rope, and passing them to an outgoing traveling rope a support fixed to said frame parallel to said shunt rail, an endless conveyer arranged to move around said support and provided with projecting fingers adapted to engage and move carriers on said rail, said fingers being adapted to be moved into an operative or inoperative position at will, and appliances for moving said frame with reference to the ground as a base.

24. For use in the formation of a spoil heap, bank or the like, a charging station, a terminal station, an endless traveling rope extending between said stations, and a movable frame adapted to bear upon the ground and through which said rope extends in a forward and backward direction, said frame having a shunt rail for receiving carriers from an incoming portion of said rope and passing them onto an outgoing portion of the rope, and appliances whereby it can be moved with reference to the ground as a base.

25. For use in the formation of a spoil heap, bank or the like, a charging station, a terminal station, an endless traveling rope extending between said stations, and a movable frame adapted to bear upon the ground and through which said rope extends in a forward and backward direction, said frame having a shunt rail for receiving carriers from an incoming portion of said rope and passing them onto an outgoing portion of the rope, and means whereby it can be moved vertically and horizontally with reference to the ground as a base.

26. For use in the formation of a spoil heap, bank or the like, a charging station, a terminal station, an endless traveling rope extending between said stations, and a movable frame adapted to bear upon the ground and through which said rope extends in a forward and backward direction, said frame having a shunt rail for receiving carriers from an incoming portion of said rope and passing them onto an outgoing portion of the rope, means for receiving material from said carriers and distributing it over the spoil heap, bank or the like, and means for moving said frame vertically and horizontally with reference to the ground as a base.

Signed at London England this 2nd day of March 1906.

JOHN PEARCE ROE.

Witnesses:
H. D. JAMESON,
A. NUTTING.